(12) United States Patent
Segal et al.

(10) Patent No.: US 12,689,648 B2
(45) Date of Patent: Jul. 21, 2026

(54) SYSTEM AND METHOD FOR MAPPING NETWORK IDENTIFIERS

(71) Applicant: Cynergy Cybersecurity, LTD., Bat Yam (IL)

(72) Inventors: Liran Segal, Yavne (IL); Andrey Gvozdenko, Rishon le Zion (IL); Michael Mishalov, Jerusalem (IL); Gil Levy, Tel Aviv (IL); Alexander Peleg, Ashdod (IL)

(73) Assignee: Cynergy Cybersecurity 2019 Ltd, Bat Yam (IL)

( * ) Notice: Subject to any disclaimer, the term of this patent is extended or adjusted under 35 U.S.C. 154(b) by 196 days.

(21) Appl. No.: 18/595,741

(22) Filed: Mar. 5, 2024

(65) Prior Publication Data

US 2025/0286904 A1 Sep. 11, 2025

(51) Int. Cl.
*H04L 9/40* (2022.01)

(52) U.S. Cl.
CPC ................................. *H04L 63/1433* (2013.01)

(58) Field of Classification Search
CPC ................................................... H04L 63/1433
See application file for complete search history.

(56) References Cited

U.S. PATENT DOCUMENTS

| | | | | |
|---|---|---|---|---|
| 8,266,699 | B2 * | 9/2012 | Oliphant | G06F 21/57 |
| | | | | 709/224 |
| 9,602,527 | B2 * | 3/2017 | Yu | H04L 63/1425 |
| 12,166,794 | B2 * | 12/2024 | Endler | H04L 63/083 |
| 2016/0127380 | A1 * | 5/2016 | Steele | H04L 63/14 |
| | | | | 726/7 |
| 2018/0288060 | A1 * | 10/2018 | Jackson | H04L 63/107 |
| 2018/0324197 | A1 * | 11/2018 | Zettel, II | H04L 63/1425 |
| 2020/0053129 | A1 * | 2/2020 | Neystadt | H04L 63/166 |
| 2021/0099490 | A1 * | 4/2021 | Crabtree | H04L 63/20 |
| 2021/0367923 | A1 * | 11/2021 | Kaidi | H04L 63/1425 |
| 2022/0141247 | A1 * | 5/2022 | Shakarian | H04L 63/1433 |
| | | | | 726/25 |

(Continued)

FOREIGN PATENT DOCUMENTS

| | | | | | |
|---|---|---|---|---|---|
| CA | 2607005 | C | * | 2/2012 | H04L 63/123 |
| CN | 110505248 | A | * | 11/2019 | H04L 43/026 |

(Continued)

*Primary Examiner* — Sarah Su
(74) *Attorney, Agent, or Firm* — M&B IP Analysts, LLC

(57) ABSTRACT

A method and system for mapping vulnerabilities to a private network identifier are provided. The method includes generating a request addressed to a public network identifier of a server, wherein the request includes a first beacon; transmitting the generated request to the server, wherein upon receiving the request by the server, the request causes a registry of a log file of the server, wherein the log includes at least the first beacon; in response to a query, receiving a response from the server, wherein the response includes a second beacon, and a private network identifier of the server; associating the public network identifier with the private network identifier, when the first beacon matches the second beacon; and mapping vulnerabilities identified with the public network identifier to associate the identified vulnerabilities with the associated public network identifier and the private network identifier.

23 Claims, 6 Drawing Sheets

(56)         References Cited

U.S. PATENT DOCUMENTS

| | | | |
|---|---|---|---|
| 2022/0353263 A1 * | 11/2022 | Choyi | H04L 12/12 |
| 2022/0394035 A1 * | 12/2022 | Schieferle Uhlenbrock | H04L 63/101 |
| 2023/0319066 A1 * | 10/2023 | Partovi | H04L 63/20 726/23 |
| 2024/0098118 A1 * | 3/2024 | Kaznocha | H04L 63/205 |
| 2025/0254183 A1 * | 8/2025 | Paul | H04L 63/1416 |
| 2025/0286899 A1 * | 9/2025 | Shriver | H04L 63/1416 |

FOREIGN PATENT DOCUMENTS

| | | | | | |
|---|---|---|---|---|---|
| CN | 110868377 | B | * | 2/2022 | H04L 63/1433 |
| CN | 119853990 | A | * | 4/2025 | H04L 51/52 |
| CN | 120342715 | A | * | 7/2025 | G06F 18/256 |
| JP | 2020155098 | A | * | 9/2020 | H04L 63/1433 |
| WO | WO-0137511 | A2 | * | 5/2001 | H04L 63/1408 |
| WO | WO-2022086596 | A1 | * | 4/2022 | H04W 8/06 |
| WO | WO-2023217685 | A1 | * | 11/2023 | H04W 74/0833 |

* cited by examiner

500

| URL 510 | Port No. 520 | Public Identifier 530 | Beacon 540 | Time Stamp 550 |
|---|---|---|---|---|
| Investoren.normagroup.com | 22 | 185.15.195.188 | B90fc3bc | Tue, 30 Jan 2024 18:49:12 GMT |
| Check.normagroup.com | 22 | 80.150.99.21 | 50966315 | Tue, 30 Jan 2024 18:49:13 GMT |
| Ru.normagroup.com | 22 | 185.15.195.188 | B90fc3bc | Tue, 30 Jan 2024 18:49:13 GMT |
| www.investoren.normagroup.com | 22 | 185.15.195.88 | B90fc3bc | Tue, 30 Jan 2024 18:49:13 GMT |
| Recruit.normagroup.com | 22 | 185.15.195.88 | B90fc3bc | Tue, 30 Jan 2024 18:49:13 GMT |
| Pki.normagroup.com | 22 | 80.150.99.21 | 50966315 | Tue, 30 Jan 2024 18:49:13 GMT |

| Date 601 | Timestamp 602 | Machine Identifier 603 | | | Message 604 | Prefix-Beacon 605 | Beacon 606 | Network parameter 607 |
|---|---|---|---|---|---|---|---|---|
| Jan 03 | 13:50:32 | Ubuntu -linux- | 22-04-02 | Desktop sshd [5345] | Invalid User | unique-string | 0ad33704 | 10.211.55.22 |
| Jan 03 | 13:50:32 | Ubuntu -linux | 22-04-02 | Desktop sshd[5345] | Failed none for invalid user | unique-string | 0ad33740 | 10.211.55.2 |

FIG. 6

SYSTEM AND METHOD FOR MAPPING NETWORK IDENTIFIERS

TECHNICAL FIELD

The present disclosure relates to cybersecurity technologies. More specifically, the disclosure relates to the method of mapping public network identifiers to private network identifiers to allow the association of identifiers.

BACKGROUND

Cybersecurity is any technology or measure used to protect any network, device, data or internet connected system from cyber-attacks. Cyber-attacks are intentional attacks used to destroy, steal, or alter data from devices through unauthorized use of the network or device. Thus, cybersecurity is a major concern for businesses, government entities, and private users as a cyber-attack may result in financial loss and downtime. Cyber attackers attempt to exploit vulnerabilities in the hardware, software, or process of the entities to conduct these malicious acts.

There are many cybersecurity solutions used to protect businesses and individuals against these cyber threats. Some of them include endpoint security, cloud security, identity and access management (IAM), anti-malware software, and application security. Moreover, IP addresses are a major tool used in cybersecurity systems to identify systems at risk or vulnerabilities within networks because they can be used to track the location or device of a user.

There are many cybersecurity tools used to detect vulnerabilities. Such tools associate the vulnerabilities with a public IP address. However, such IP addresses do not provide direct association with the entity (e.g. server or application being attacked). As such, entities remain vulnerable.

It would therefore be advantageous to provide a solution that would overcome the challenges noted above.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include generating a request addressed to a public network identifier of a server, where the request includes a first beacon; transmitting the generated request to the server, where upon receiving the request by the server, the request causes a registry of log in a log file of the server, where the log includes at least the first beacon; in response to a query, receiving a response from the server, where the response includes a second beacon, and a private network identifier of the server; associating the public network identifier with the private network identifier, when the first beacon matches the second beacon; and mapping vulnerabilities identified with the public network identifier to associate the identified vulnerabilities with the associated public network identifier and the private network identifier. Other embodiments of this aspect include corresponding computer systems, apparatus, and computer programs recorded on one or more computer storage devices, each configured to perform the actions of the methods.

In one general aspect, non-transitory computer-readable medium may include one or more instructions that, when executed by one or more processors of a device, cause the device to: generate a request addressed to a public network identifier of a server, where the request includes a first beacon. Non-transitory computer-readable medium may also include transmit the generated request to the server, where upon receiving the request by the server, the request causes a registry of log in a log file of the server, where the log includes at least the first beacon. Medium may furthermore include in response to a query, receive a response from the server, where the response includes a second beacon, and a private network identifier of the server. Medium may in addition include associate the public network identifier with the private network identifier, when the first beacon matches the second beacon. Medium may moreover include map vulnerabilities identified with the public network identifier to associate the identified vulnerabilities with the associated public network identifier and the private network identifier. Other embodiments of this aspect include corresponding computer systems, apparatus, and computer programs recorded on one or more computer storage devices, each configured to perform the actions of the methods.

In one general aspect, system may include one or more processors configured to: system may also include generate a request addressed to a public network identifier of a server, where the request includes a first beacon. System may furthermore include transmit the generated request to the server, where upon receiving the request by the server, the request causes a registry of log in a log file of the server, where the log includes at least the first beacon. System may in addition include in response to a query, receive a response from the server, where the response includes a second beacon, and a private network identifier of the server. System may moreover include associate the public network identifier with the private network identifier, when the first beacon matches the second beacon. System may also include map vulnerabilities identified with the public network identifier to associate the identified vulnerabilities with the associated public network identifier and the private network identifier. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

3

FIG. 5 is a table illustrating a sample request generated by the mapping system according to an embodiment.

FIG. 6 is an example data structure of a log generated according to an embodiment.

Figure 7:
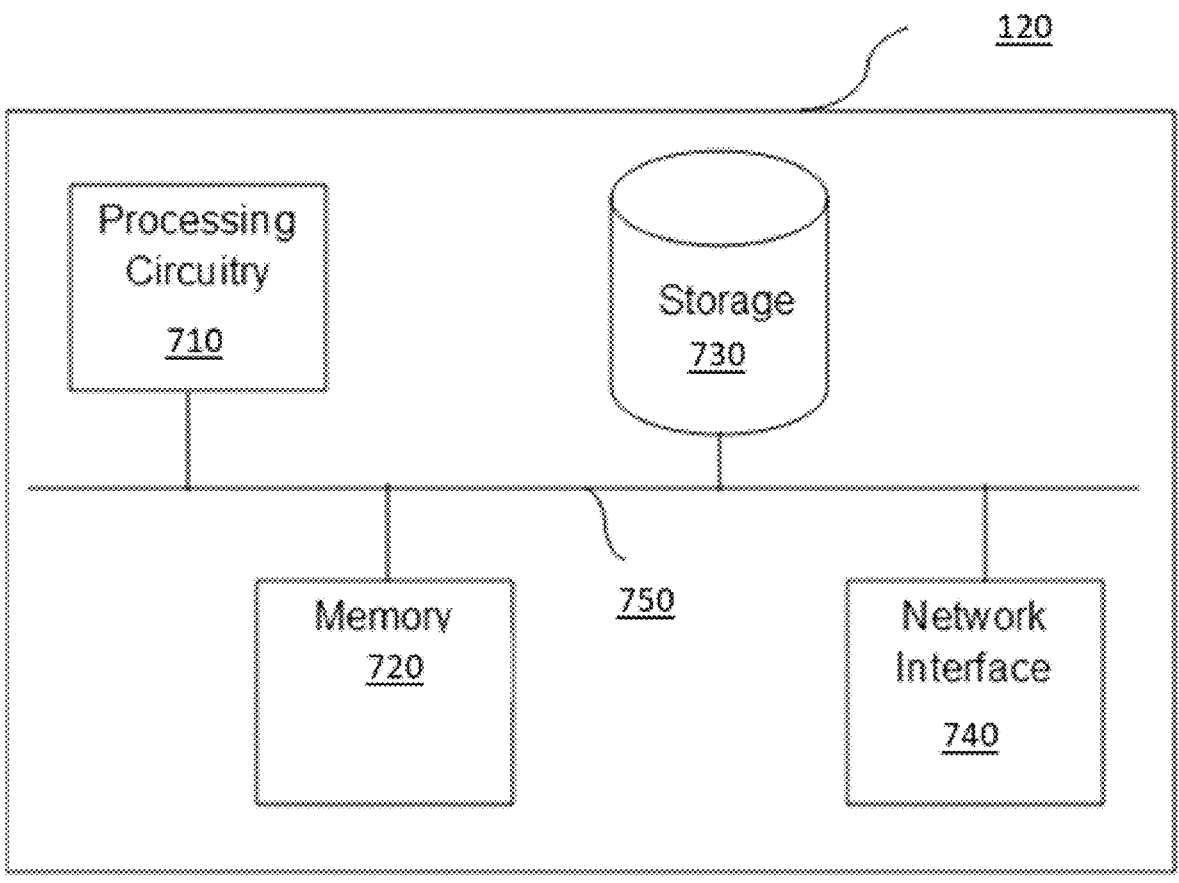

FIG. 7 is a schematic diagram of a mapping system according to an embodiment.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for mapping or otherwise associating a private network identifier of a protected entity to its respective public network identifier. Mapping may be performed by determining whether encrypted data, such as a first beacon, associated with the public network identifier matches a second beacon stored in an internal server. It should be noted that the public network identifier of a protected entity (e.g., a server) may be assigned or set randomly and frequently. The first have second beacons have the same structure and are generated in the same way.

The technical improvements of the disclosed system and method allow the mapping of vulnerabilities associated with the public address with the private identifier, thereby allowing easy protection of the protected. Another technical improvement of this system is the ability to define a security policy for the private address and take mitigating action against the private address.

Furthermore, as the public network identifier frequently changes, the disclosed embodiments allow for the initiation of the mapping process when a new public network identifier is detected or discovered. Thereby, the disclosed embodiment provides continuous mapping and variabilities.

Figure 1:
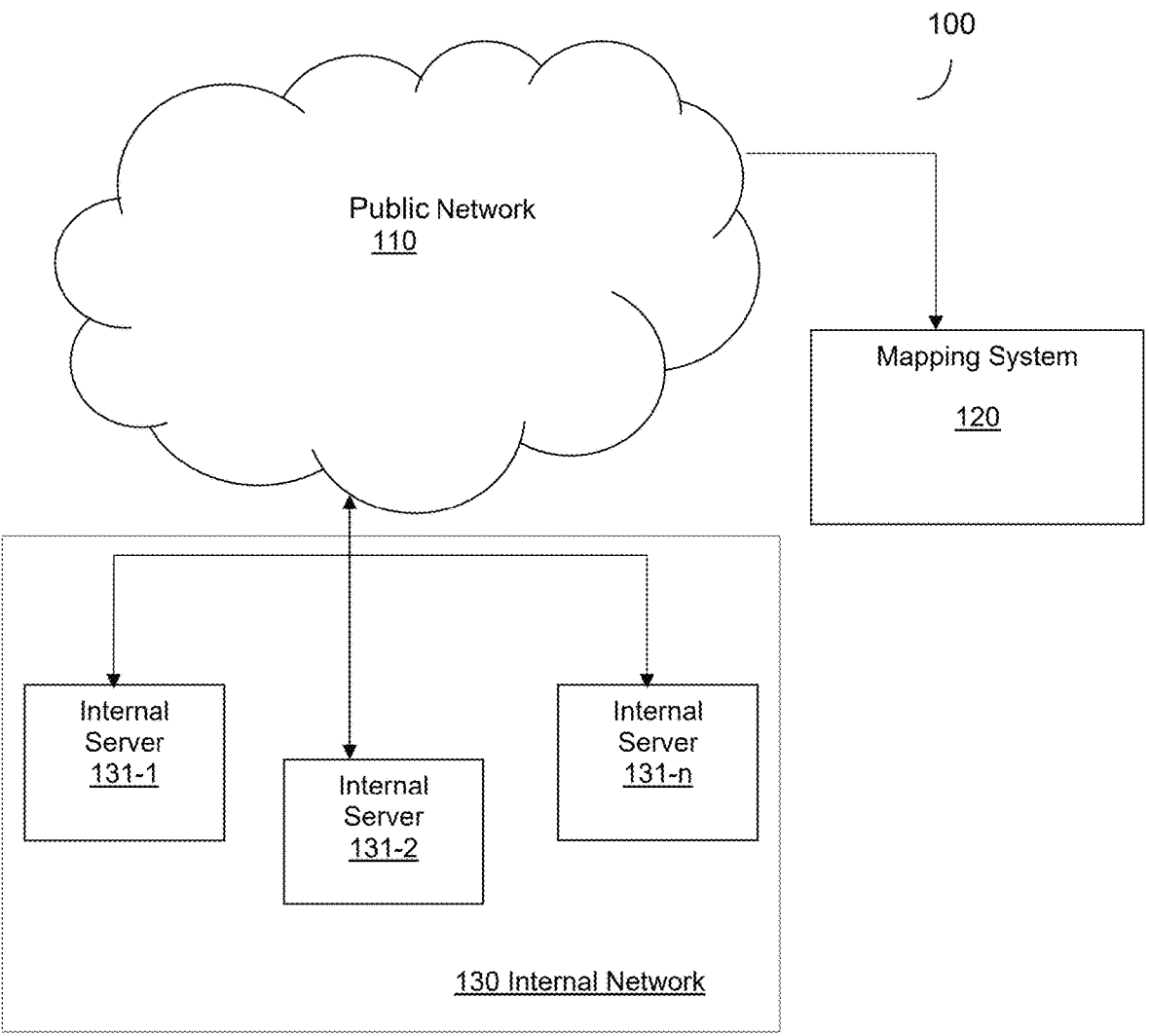
FIG. 1 is a network diagram utilized to describe various disclosed embodiments.

FIG. 1 shows an example network diagram 100 utilized to describe the various disclosed embodiments. In the example network diagram 100, a mapping system 120, an internal network 130, and a plurality of internal servers 131-1 through 131-N (hereinafter referred to individually as an internal server 131 and collectively as internal servers 131, merely for simplicity purposes) are communicatively connected via a "public" network 110. The public network 110 may be, but is not limited to, a wireless, cellular or wired network), a wide area network (WAN), a metro area network (MAN), the Internet, the Worldwide web (WWW), similar networks, and any combination thereof.

Server 131 may be, but is not limited to a computer, computing device, data processor, and/or information processing system. Server 131 may host a protected entity (PE) 250 which may include, for example, an application, a service, a website, a web application, a cloud application, and so on. Server 131 itself may be a protected entity. Server 131 may be realized as a physical machine, a virtual machine, a software container, a server function, or a combination thereof, and the like. A protected entity hosted by a server 131 may be accessed by a private network identifier. For example, a private network identifier with a service running over server 131.

Servers 131 are connected via an internal network 130. The internal network 130 may be incorporated into cloud technologies, including a cloud computing platform. In one configuration, the internal network 130 is a subnet, a virtual private cloud (VPC), and the like. The internal network 130 is addressed by a public network identifier. The network The mapping system 120 may be, but is not limited to, a server, an appliance, a physical machine, a virtual machine, and the like. One example of the mapping system 120, implemented as a physical machine, 120, is shown in FIG. 7. The mapping system 120 is configured to generate requests to obtain access to server 131. As will be discussed below, such requests will cause registration or storage of unique beacons in a log file of each server 131 receiving the requests.

According to the disclosed embodiment, the mapping system 120 is configured to map a public network identifier with the private network identifier of a protected entity hosted by a server 131. The mapping or association may be one-to-one, one-to-many, or many-to-one. That is, one public network identifier can be mapped to one private network identifier, one public network identifier can be mapped to a plurality of private network identifiers, and a plurality of public network identifiers can be mapped to a private network identifier. The mapping can be also multiple public identifiers to multiple private identifiers, e.g., in a case of a multiregional deployment under scale.

The public network identifier 200 may be, but is not limited to, an IP address, uniform resource locator (URL), or any type of public network identifier that that can provide access a server 131. It should be noted that a public address may be of an application, a service, a process hosted and/or executed by a server 131. The private network identifier may be, for example, an IP address, or any other network identifier that is not accessible outside of the internal network 130. The private network identifier is not discoverable by a discover process.

According to the disclosed embodiments, the public network identifier can be discovered through a discovery process. The discovery process may be initiated by the mapping on demand or be performed continuously.

Figure 2:
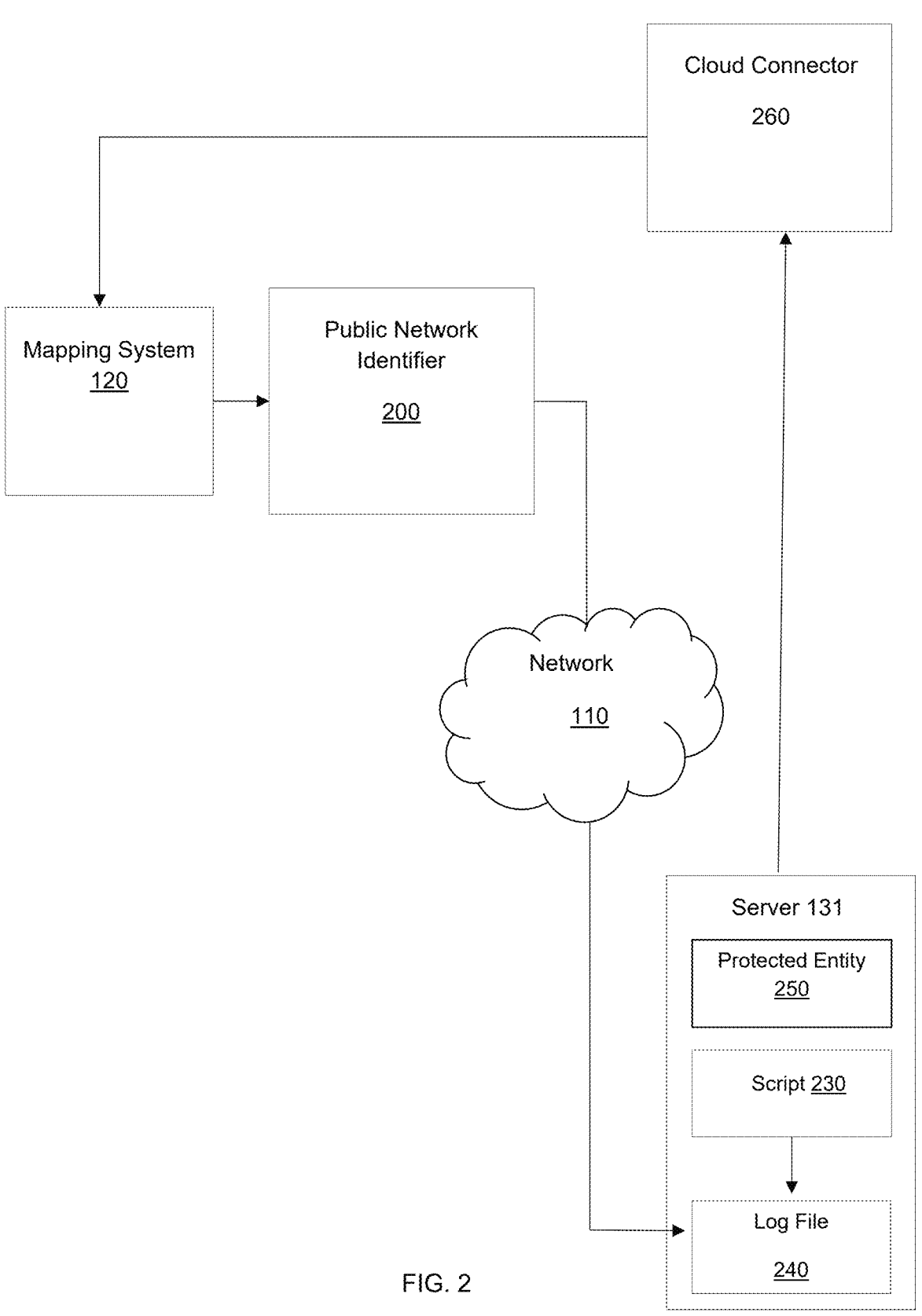
FIG. 2 is a schematic diagram utilized to describe the operation of the mapping system according to one embodiment.

FIG. 2 is an example schematic diagram utilized to describe the operation of the mapping system 120 according to an embodiment. The mapping system 120 is configured to utilize the public network identifier 200 to connect to server(s) 131 through the public network 110. The mapping system 120 is also communicatively connected to a cloud connector 260.

Cloud connector 260 facilitates the integration and communication between a cloud computing environment hosting server 131 and the mapping system 120 to enable secure data exchange. Cloud connector 260 also enables the connecting of different systems, handling tasks like authentication, data transformation, and secure transmission.

The mapping system 120 is configured to generate a request that is utilized to "implant", register, or store a beacon in the log file 240 of server 131. The request is sent to server 131 and may include parameters such as, but is not limited to, a public network identifier 200, asset identification, a port number, and a unique beacon. FIG. 5 shows an example structure of a payload included in a generated request. For example, the payload may be TPC/IP request's payload or an HTTP request's payload.

In an embodiment, the request is received at server 131 and processed by server 131 to write a log in the log file 240. The log file 240 stores the log and may store other system logs of the server 131. In an example, a beacon is included in a payload of the request. The request is structured to cause server 131 to write the log file. For example, the request may be an access to an authorized section (e.g., a webpage, a service, a function), such a request would trigger a failure log that would include the payload of the request including some metadata on the request (e.g., timestamp, source IP address, etc.). As another example, the request may be an audit request that would trigger a log registry in the log file 240. FIG. 6 shows an example structure of a log stored in a log file and a request is processed by the server.

In an embodiment, the script 230 is configured to parse or search the log file 240 to identify the a (second) beacon and matching a (first) beacon identified in the query.

In an embodiment, the script 230 is also configured to search for a second beacon in the log file 240. If a beacon in the query matches a beacon in the log file 240, the script 230 is configured to send a response with the private network identifier of a protected entity to mapping system 120. In one configuration, the response is sent via cloud connector 160.

In an embodiment, the script 230 may be realized but is not limited to any software development kit (SDK), a software component, JavaScript®, Python®, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

Figure 3:
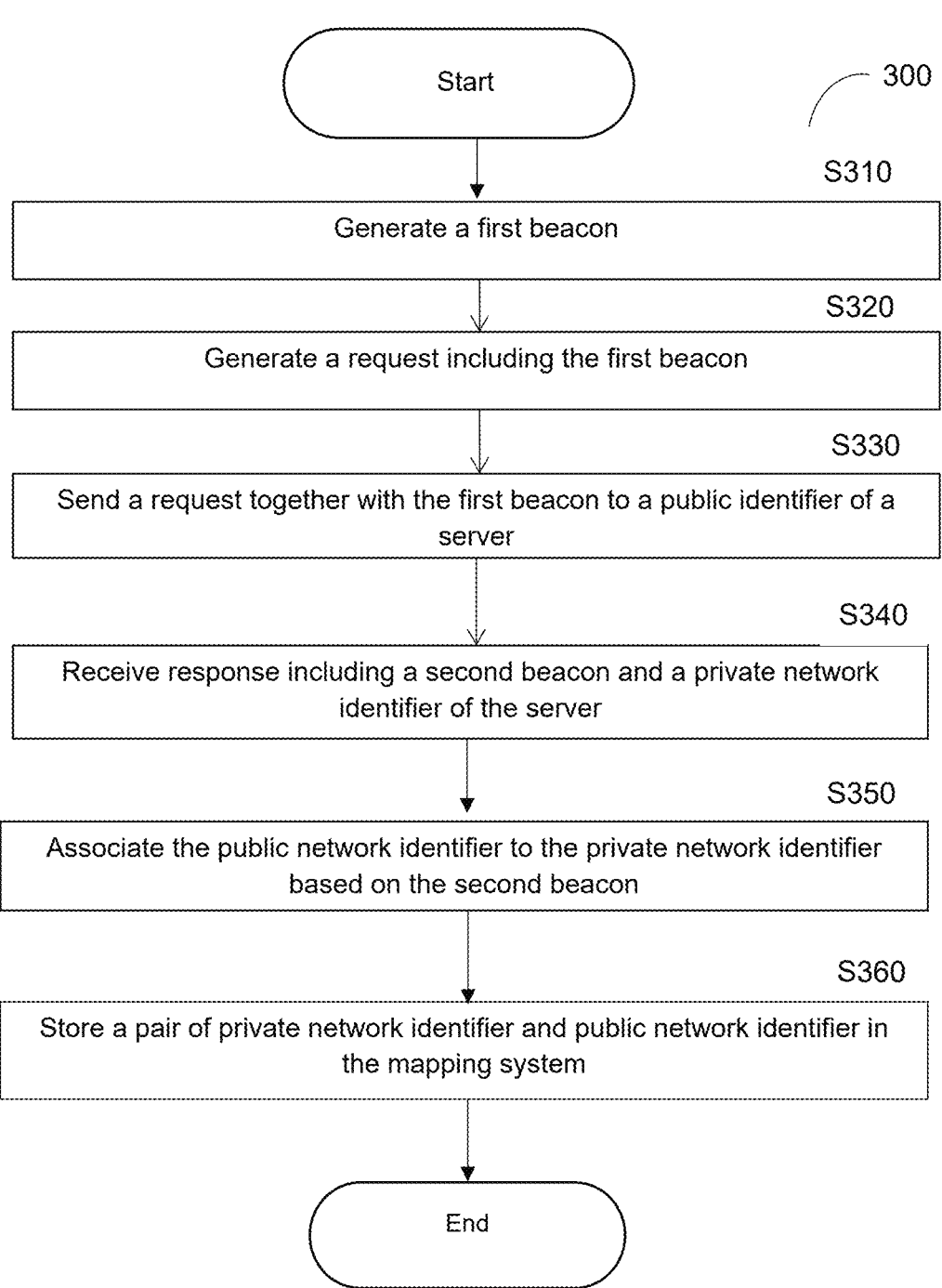
FIG. 3 is a flowchart illustrating a method for mapping public network identifiers to private network identifiers according to an embodiment.

FIG. 3 is an example flowchart 300 illustrating a method for mapping public network identifiers to private network identifiers according to an embodiment.

The method may be performed by the mapping system, such as the mapping system 120.

At S310 a first beacon is generated. In one embodiment, the generated beacon is a unique identifier and is computed by using a hash function computed over, for example, a public network identifier. For example, and without limitation, any generated beacon may be made up of numerals, letters, and or symbols.

At S320 a request including the first beacon is generated. In an embodiment, S320 generating a payload data to be included in a request, such as TCP/IP or HTTP request. The payload data, and hence the request may further include, but is not limited to, a port number, a timestamps, and the like. An example structure of a payload data is shown in FIG. 5.

At S330 a request together with the first beacon is sent to a public network identifier of a server 131. The request can be sent using a TCP/IP and/or hypertext transfer protocol (HTTP), HTTPs, over any other types of Layer-4 or Layer-7 protocols. The request may further include but is not limited to, a public network identifier, asset identification, a port number, and/or a beacon.

At S340, a response, including a second beacon and a private network identifier of the server, is received. The response, including the second beacon and the private network identifier may be returned to the mapping system by the cloud connector 260. In an example embodiment, the response is received after querying the server for the private network identifier. The process for returning the private identifier in response to a matching beacon is discussed in FIG. 4. It should be noted that the S340 includes checking if the response includes a null value. Such a value would be returned in the case that no matching beacon was found in the log file 240. It is important to note that the first and second beacons are generated using the same method and have identical structures. The terms "first" and "second" are used solely to simplify the explanation and comprehension of the disclosed embodiments.

At S350, the public network identifier is associated with the private identifier based on the first and second beacons matching. For example, a query request sent to the server may include a first beacon 540 (e.g., B90fc3bc). An example of a response sent back to the server may include the private network identifier and the second (matching) beacon (e.g. B90fc3bc).

At S360, a pair of the private network identifier and public network identifier are stored in the mapping system 120. In an embodiment, the mapping or association between the public network identifiers and private network identifiers is stored with an aging parameter. Any stored association may be deleted when the aging parameter reaches a predefined value.

In some example embodiments, vulnerabilities can be reported to the mapping system 120 by one or more cyber-security tools. Such vulnerabilities are detected by the cyber-security tools and may be associated with a public network identifier. In such an embodiment, any detected vulnerability can be attached to the pair of private and public network identifiers.

In some embodiments, the process described with reference to FIG. 3, can be triggered by a discovery process when a new public network identifier is discovered. As noted above, the public network identifier is randomly and frequently generated or updated; thus, triggering that process when a new identifier is discovered which ensures an accurate and current mapping of identifiers.

Figure 4:
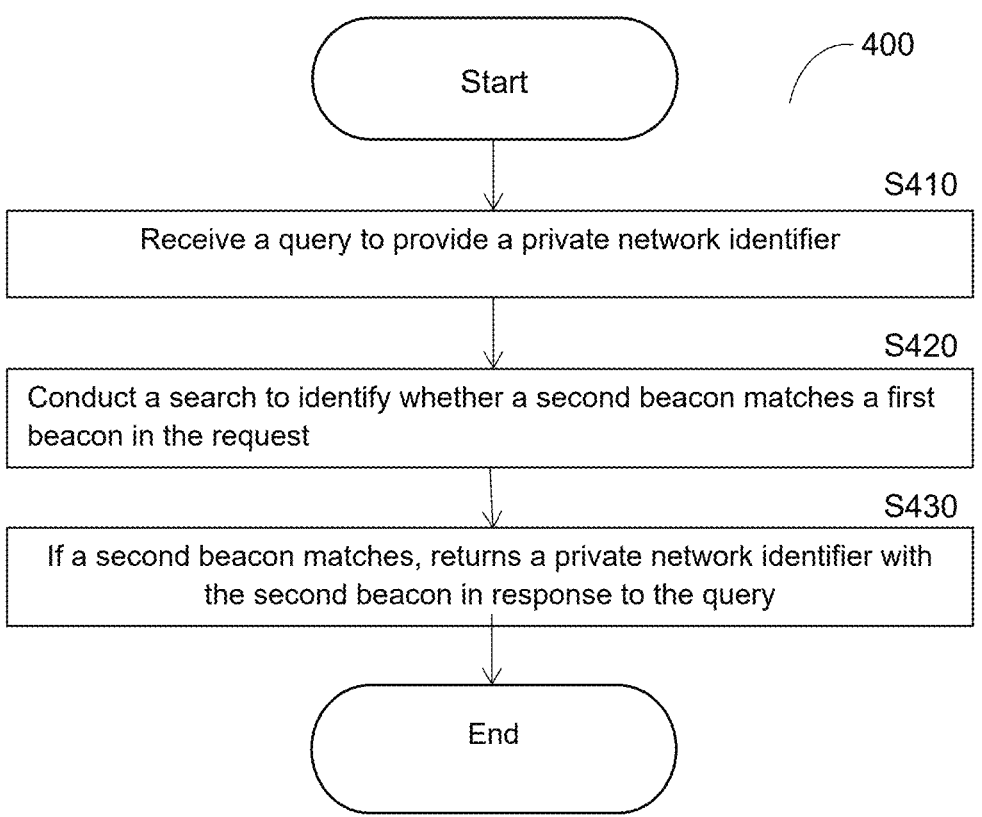
FIG. 4 is a flowchart illustrating a method for retrieving a private network identifier based on a beacon according to an embodiment.

FIG. 4 is an example flowchart 400 illustrating a method for retrieving a private network identifier based on associating a first beacon to a second beacon according to an embodiment. The method may be performed by a server, such as a server 131.

At S410, a query to return a private network identifier is received. For example, the query may be sent to the server 131 via the cloud connector 260. The query may include at least a beacon. The query may also include a beacon prefix. The parameters (beacon and beacon prefix) are used to search the log file 240.

At S420, a search is conducted to identify whether a beacon stored in the log file 240 matches the beacon designated in the query. If both beacons match, a private network identifier of server 131 (or protected entity) is obtained.

At S430, a response to a query is returned to the mapping system. The response includes at least the obtained private identifier and the second beacon. In an embodiment, the response is sent to the mapping system via a cloud connector. It should be noted that the response sent at S430 is not an action triggered by a request sent to server 131 to register a log. That is, the response sent in S430 is not a response to a request sent at S320.

FIG. 5 is a table illustrating sample request 500 generated by the mapping system 120. The request may include, but is not limited to a URL 510, a public network identifier 520, a port number 530, a beacon 540, and/or a timestamp 550. The timestamp 550 may indicate the date, day, hour, and time zone of when the request is received by the server 131. This sample data which may include but is not limited to including a URL, a public identifier, a port number, and/or a timestamp, may be stored by the log file 240.

FIG. 6 is a data structure of a log 600 generated according to an embodiment. A log 600 may include the following fields a date 601, a timestamp 602, a machine identifier 603, a message 604, a beacon prefix 605, a beacon 606, and a network parameter 607. The beacon prefix 605 may be a string identifying, for example, the mapping system. The beacon prefix 605 allows to expedite the search for a matching beacon. The network parameter 607 may include, for example, a source IP address of the mapping system.

FIG. 7 is an example schematic diagram of a mapping system 120. The mapping system 120 includes a processing circuitry 710 coupled to a memory 720, a storage 730, and a network interface 740. In an embodiment, the components of the mapping system 120 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the mapping system 120 to communicate with, for example, the internal network 130.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for mapping vulnerabilities to a private network identifier, comprising:
   generating a request addressed to a public network identifier of a server, wherein the request includes a first beacon;
   transmitting the generated request to the server, wherein upon receiving the request by the server, the request causes a registry of log in a log file of the server, wherein the log includes at least the first beacon;
   in response to a query, receiving a response from the server, wherein the response includes a second beacon, and a private network identifier of the server;
   associating the public network identifier with the private network identifier, when the first beacon matches the second beacon; and
   mapping vulnerabilities identified with the public network identifier to associate the identified vulnerabilities with the associated public network identifier and the private network identifier.

2. The method of claim 1, wherein generating the request further comprises: generating the first beacon, wherein the first beacon is a unique identifier.

3. The method of claim 1, further comprising:
   storing the associated public network identifier and the private network identifier in a storage.

4. The method of claim 1, wherein causing the registry of the log in the log file further comprising:

configuring the request to perform an action forcing the server to register the at least the first beacon in the log file.

5. The method of claim 4, wherein the action includes at least: an unauthorized request, or a legitimate request.

6. The method of claim 1, identifying the vulnerabilities detected with respect to at least the public network identifier further comprises:

receiving the vulnerabilities from at least one cyber-security tool.

7. The method of claim 1, wherein the log further comprises: the first beacon, a time stamp, a port number, a uniform resource locator (URL).

8. The method of claim 1, wherein the private network identifier is at least an Internet Protocol (IP) address.

9. The method of claim 1, wherein the public network identifier is any of: an IP address, and a uniform resource locator (URL).

10. The method of claim 1, wherein the request is any of: an HTTP request and an TCP/IP request, wherein the first beacon is included in a payload data of the request.

11. The method of claim 1, wherein the server is any one of: a physical machine, a virtual, a software container, a service, and wherein the server is deployed in a cloud computing platform.

12. A non-transitory computer-readable medium storing a set of instructions for mapping vulnerabilities to a private network identifier, the set of instructions comprising:

one or more instructions that, when executed by one or more processors of a device, cause the device to:

generate a request addressed to a public network identifier of a server, wherein the request includes a first beacon;

transmit the generated request to the server, wherein upon receiving the request by the server, the request causes a registry of log in a log file of the server, wherein the log includes at least the first beacon;

in response to a query, receive a response from the server, wherein the response includes a second beacon, and a private network identifier of the server;

associate the public network identifier with the private network identifier, when the first beacon matches the second beacon; and map vulnerabilities identified with the public network identifier to associate the identified vulnerabilities with the associated public network identifier and the private network identifier.

13. A system for mapping vulnerabilities to a private network identifier comprising:

one or more processors configured to:

generate a request addressed to a public network identifier of a server, wherein the request includes a first beacon;

transmit the generated request to the server, wherein upon receiving the request by the server, the request causes a registry of log in a log file of the server, wherein the log includes at least the first beacon;

in response to a query, receive a response from the server, wherein the response includes a second beacon, and a private network identifier of the server;

associate the public network identifier with the private network identifier, when the first beacon matches the second beacon; and map vulnerabilities identified with the public network identifier to associate the identified vulnerabilities with the associated public network identifier and the private network identifier.

14. The system of claim 13, wherein the one or more processors, when generating the request, are configured to:

generate the first beacon, wherein the first beacon is a unique identifier.

15. The system of claim 13, wherein the one or more processors are further configured to:

store the associated public network identifier and the private network identifier in a storage.

16. The system of claim 13, wherein the one or more processors, when causing the registry of the log in the log file, are configured to:

configure the request to perform an action forcing the server to register the at least the first beacon in the log file.

17. The system of claim 16, wherein the action includes at least any of:

an unauthorized and a legitimate request.

18. The system of claim 13, wherein the one or more processors are further configured to: receive the vulnerabilities from at least one cyber-security tool.

19. The system of claim 13, wherein the log further comprises:

the first beacon, a timestamp, a port number, a uniform resource locator (URL).

20. The system of claim 13, wherein the private network identifier is at least an Internet Protocol (IP) address.

21. The system of claim 13, wherein the public network identifier is any of:

an IP address, and a uniform resource locator (URL).

22. The system of claim 13, wherein the request is any of:

an HTTP request and q TCP/IP request, wherein the first beacon is included in a payload data of the request.

23. The system of claim 13, wherein the server is any one of: a physical machine, a virtual machine, a software container, a service, and wherein the server is deployed in a cloud computing platform.

* * * * *